Sept. 8, 1970     H. FUERST     3,526,962
DENTAL VIBRATOR FOR SCALING TEETH
Filed Jan. 24, 1969
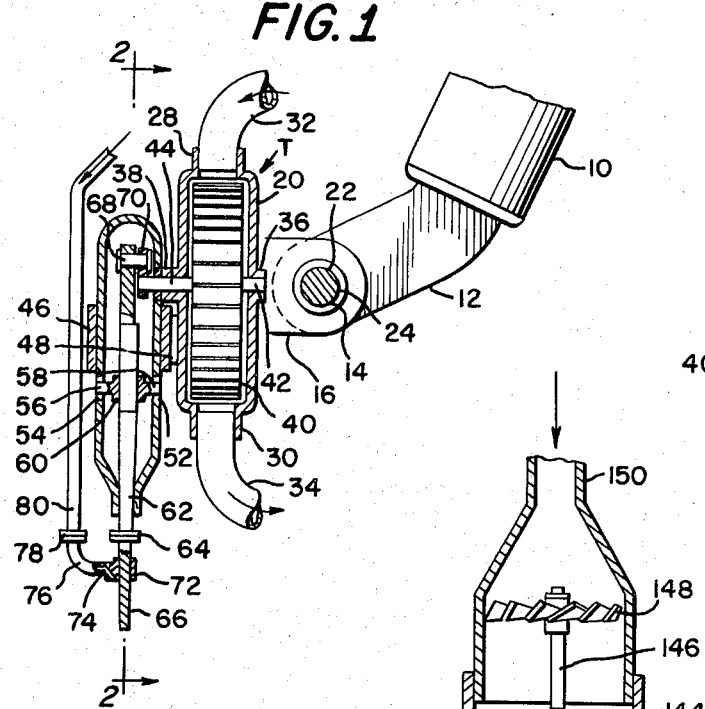
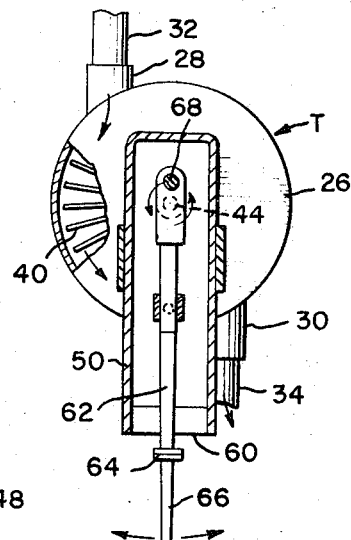
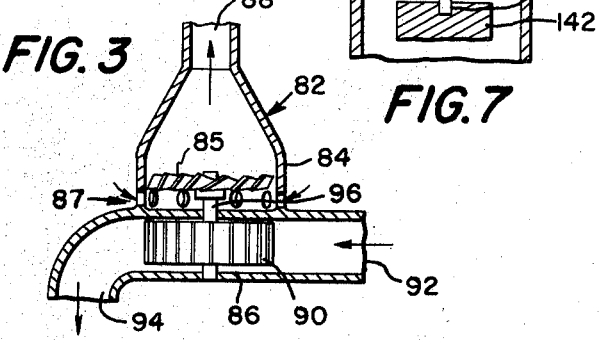
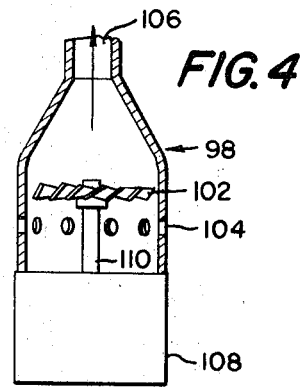
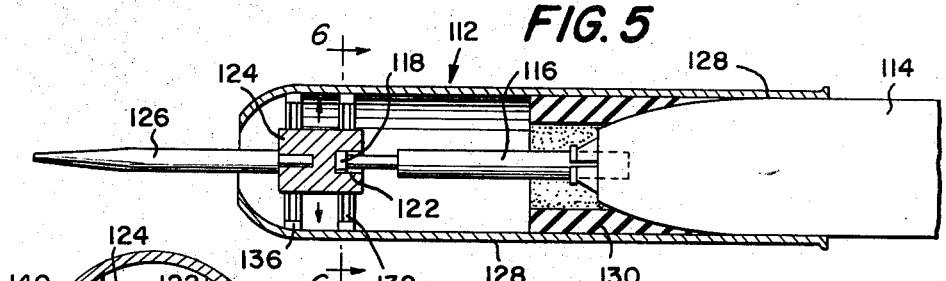
INVENTOR
HERBERT FUERST
BY *Jacobi + Davidson*
ATTORNEYS

United States Patent Office 3,526,962
Patented Sept. 8, 1970

3,526,962
DENTAL VIBRATOR FOR SCALING TEETH
Herbert Fuerst, First Federal Bldg.,
Rocky Mount, N.C. 27801
Filed Jan. 24, 1969, Ser. No. 793,727
Int. Cl. A61c 3/16
U.S. Cl. 32—50      3 Claims

ABSTRACT OF THE DISCLOSURE

A vibrating appliance used by dentists to massage gums, remove calculus or tartar from teeth and excess cement from crowns or orthodontic bands wherein an air driven turbine through a mechanical linkage effects vibration of a dental tool, particularly a scaler. The turbine receives its air supply from a water or electric motor driven fan. In another form of the invention, a dental handpiece is provided with a mandrel that drives a head member provided with a plurality of protuberances that sequentially engage the walls of an elongated slot in a member which carries the dental tool to be vibrated.

BACKGROUND OF THE INVENTION

The present invention relates to dental apparatus and more particularly to dental equipment employed in a dentist's office for brushing teeth, stimulating the gums by massaging them, cleaning tartar or calculus deposits from the teeth and in removing hardened cement from orthodontic bands.

In many dental offices the above-mentioned operations are still performed by conventional methods which make use of manually operated picks, scalers and other instruments notwithstanding the fact that more modern instruments have been developed that make use of ultrasonic techniques. While it is recognized that the use of the modern ultrasonic scalers is capable of removing the calculus from teeth much faster than conventional scalers and with little, if any, discomfort to the patient, the cost of their installation and the additional space that they require in an already overcrowded dental office makes their use, in some situations, too costly or impractical.

Taking into consideration the foregoing deficiencies, it is the primary object of the present invention to provide a dental appliance which is capable of producing a power actuated operation of the normally hand-operated instruments that a dentist normally employs in carrying out his usual day-by-day procedures.

Another object of the invention is to provide a power actuated dental attachment which is capable of producing a high speed reciprocating movement or vibration of a dental instrument such as a toothbrush, chisel or scaler.

Yet another object of the invention is to provide a scaler for cleaning tartar or calculus from teeth that is mechanically actuated with a reciprocating motion by an air actuated motor such as a turbine.

Still another object of the invention is to provide a scaler for removing tartar or calculus from teeth that is mechanically reciprocated by an air actuated turbine that derives its driving air from a water motor actuated air fan or blower that is located a substantial distance from the turbine.

A further object of the invention is to provide a scaler for removing tartar or calculus from teeth that is reciprocated by an air actuated turbine that derives its driving air from an electric motor actuated air fan or blower.

Another further object of the invention is to provide a scaler for removing tartar or calculus from teeth that is reciprocated by a slidably mounted block-like member that in turn is actuated by a cam construction provided with protruding cam elements on its periphery.

Still another further object of the invention is to provide a scaler for removing tartar or calculus from teeth that is reciprocated by a slidably mounted block-like member that in turn is actuated by a cam construction provided with a plurality of odd numbered raised cam elements on its periphery.

An additional object of the invention is to provide a scaler for removing tartar or calculus from teeth that is reciprocated by a slidably mounted block-like member that is actuated by cam means attached to and driven by an air operated turbine.

Another additional object of the invention is to provide a scaler for removing tartar or calculus from teeth that is reciprocated by a slidably mounted block-like member that is actuated by cam means attached to and driven by a conventional dental handpiece.

A further additional object of the invention is to provide a power actuated reciprocating scaler for removing tartar or calculus from teeth which includes means associated with the reciprocating scaler to discharge a stream of water onto the moving scaler in order to wash debris, detritus or blood from a patient's mouth or apply medicament thereto for prophylaxis.

The invention will be better understood and objects other than those set forth above will become apparent, after reading the following detailed description thereof. Such description refers to the annexed drawings presenting preferred and illustrative embodiments of the invention.

In the drawings:

FIG. 1 is a side elevational view of a handpiece mounted, turbine operated, scaler with the turbine and parts of the scaler shown in section;

FIG. 2 is a front elevational view of the turbine and scaler with parts of the turbine and scaler shown in section;

FIG. 3 is a sectional view showing a water turbine operated air fan;

FIG. 4 is a view, partly in section, showing an electric motor operated air fan;

FIG. 5 is a view, partly in section, showing an arrangement for vibrating a scaler mounted on a conventional dental handpiece;

FIG. 6 is a sectional view taken on section line 6—6 of FIG. 5;

FIG. 7 is a sectional view showing an air operated arrangement for operating the vibration producing means shown in FIGS. 5 and 6.

DESCRIPTION OF THE PREFERRED EMBODIMENT

Referring to the drawings, it is to be noted that the device disclosed in FIGS. 1 and 2 includes an air turbine handpiece 10 from which extends, at an angle, a flat arm 12 which is provided with a circular opening 14 extending therethrough. A pair of parallel arms 16, only one of which can be seen in the drawings, extend away from the inner wall 18 of a housing 20 of an air turbine indicated generally by the reference letter T. The pair of arms 16 are each provided with a circular opening 22 and these openings are arranged to be in alignment. A shaft 24 extends through the circular openings 22 and is supported between the pair of parallel arms 16. The flat arm 12, which extends at an angle to handpiece 10, is rotatably supported on shaft 24 so as to provide for relative angular movement between the turbine housing 20 and flat arm 12.

The air turbine casing or housing 20 also includes an outer wall 26 and is provided with an air inlet opening 28 and an air outlet opening 30 to which inlet and outlet opening conduits 32 and 34 are, respectively, connected.

The outer surface of the inner wall 18 is provided with a bearing 36 and the outer surface of the outer wall is provided with a similar bearing 38 in alignment with bearing 36. The air turbine T has a turbine wheel 40 located within the turbine housing 20. Turbine wheel 40 has a pair of wheel supporting shafts 42, 44, respectively connected to and supported from its opposite sides with the wheel supporting shaft 42 rotatably mounted in bearing 36 and wheel supporting shaft 44 rotatably mounted in bearing 38. A sleeve member 46 is secured to the turbine housing 20 by any well known attaching means such as arm 48. A casing 50 is secured within the sleeve member 46. Casing 50 is provided with bearing members 52, 54 in its opposite walls. Pivotally mounted in bearings 52, 54 by means of the shafts 56, 58 is a dental tool actuating arm supporting ring 60. Mounted in the actuating arm supporting ring 60 is a tool actuating arm 62 that extends through the open end of casing 50. The dental tool actuating arm 62 is attached, at its outer end, by means of a conventional coupling 64, to a dental tool such as a scaler 66. The inner end of tool actuating arm 62 is connected by means of a crank pin 68 and crank arm 70 to turbine wheel supporting shaft 44.

A liquid discharge element 72 supported, in any well known manner from casing 50, includes at one end a discharge orifice 74 positioned to direct a jet of water or medicament onto the surface of scaler 66. The liquid discharge element 72 is curved upwardly as at 76 and connected by a conventional coupling means 78 to a liquid supply conduit 80 provided with conventional valve control means, not illustrated.

Air for operating the air turbine may be obtained from any available source of supply and connected to air inlet conduit 32, but if such source is unavailable or be found for various reasons to be inadequate, it may be obtained from a power operated fan or blower such as illustrated in FIGS. 3 and 4.

In FIG. 3 one form of power operated fan 82 is illustrated. It comprises a fan casing 84 and a motor casing 86. Fan casing 84 is provided with an air propelling element or fan blade structure 85, a plurality of circumferentially spaced air inlet openings 87 and an air outlet opening 88 which is in fluid communication with turbine inlet conduit 32. A fluid motor in the form of a gas or liquid operated turbine 90 is located in motor casing 86 that is provided with a fluid inlet conduit 92 and a fluid outlet conduit 94. The turbine 90 is coupled by means of a shaft 96 to the air propelling element or fan blade structure 85.

In FIG. 4 another form of power operated fan 98 is illustrated. It comprises a fan casing 100 and a motor casing 102. Fan casing 100 is provided with an air propelling element 102, a plurality of circumferentially spaced air inlets 104 and an air outlet 106 which is attached to turbine inlet conduit 32. An electric motor 108 is coupled to the air propelling element 102 by a shaft 110.

When it is desired to make use of the above-described apparatus, a tool such as a brush, dental chisel, scaler or interdental stimulator tip is selected by the dentist from his armamentaria and coupled onto the tool actuating arm 62. The turbine T is then pivoted relative to handpiece 10 until the tool attached to tool actuating arm 12 is properly positioned for the most effective use by the operator thereof.

In the form of the invention illustrated in FIG. 3, fluid under pressure is admitted into inlet conduit 92 of the fluid motor casing 86 and impinges on the blades of the fluid turbine 90. This causes the turbine 90 to rotate at a relatively high rate of speed. The rotation of the turbine, by means of shaft 96 causes air fan 84 to also rotate at a high rate of speed and results in air being drawn into the fan casing 84 through circumferentially spaced inlet openings 86 and discharged through an outlet 87 into turbine inlet conduit 32 connected to turbine T. Air flowing into turbine T from conduit 32 rotates turbine wheel 40 and is discharged through outlet opening 30 and outlet conduit 34. Rotation of turbine wheel 40, by means of shaft 44, crank pin 68 and crank arm 70 results in the tool actuating arm 62 and a dental tool, such as a scaler, brush or interdental stimulator attached thereto, to reciprocate or vibrate at such high speeds that an effective scaling, brushing or interdental stimulating action is produced.

The motor driven fan arrangement illustrated in FIG. 4 is intended to be used in a construction similar to that previously described. More specifically, an electrical motor driven fan 98 is provided in lieu of the fluid motor driven fan 82 for providing the stream of air that is required to drive the air turbine T.

Referring now to FIGS. 5 and 6, another form of dental appliance, particularly useful in vibrating dental tools such as scalers, toothbrushes or interdental stimulators is illustrated. For example, such an appliance is indicated generally at 112 mounted on a conventional dental handpiece 114 that is provided with a mandrel 116 which is frictionally engaged on the handpiece 114 and rotatably driven thereby. The outer end of the mandrel 116 is provided with a head member 118 that has an odd number of protuberances 120 on its periphery. Head member 118 extends into an elongated slot 122 formed on the inner end of a guide block 124. The protuberances 120 are so spaced around the periphery of the head member 118 that upon rotation of the head member 118 and sequential engagement of the protuberances 120 with opposite walls of the elongated slot 122, the guide block member 124 is reciprocated or vibrated and imparts to the dental tool 126 attached to the guide block 124 a vibratory motion. The rate of vibration of the dental tool 126 depends on the speed of rotation of mandrel 116 and the number of protuberances 120 that are provided on head member 118.

Surrounding guide block member 124 and mandrel 116 and frictionally mounted on the dental handpiece 114 is a mounting sleeve 128. Inward movement of the mounting sleeve on the dental handpiece is limited by a collar 130 located on the interior of mounting sleeve 128 which also may frictionally engage handpiece 114. Mounting sleeve 128 is provided with a pair of guide flanges or tracks 132, 134 that lie in the same plane but are located on diametrically opposed portions of mounting sleeve 128. A similar pair of guide tracks or flanges, only one of which, 136, can be seen in the drawings, are mounted so as to lie in a plane longitudinally spaced from but parallel to the plane containing guide tracks 132, 134. The guide tracks serve in cooperation with means provided on the guide block 124 to insure that the guide block 124 will travel back and forth in a straight line without binding, thereby making high speed vibration of the head block and associated dental tool possible. In the illustrated embodiment, the guide block member 124 is provided with guide grooves such as 138, 140 to, respectively, receive the guide tracks or flanges 132, 134. The guide block member 124 is also provided with guide grooves to cooperate with the guide track or flanges which lie in a plane longitudinally spaced from the plane containing guide tracks 132, 134. However, it should be readily apparent that instead of the guide block member 124 being provided with grooves such as 138, 140 to cooperate with guide tracks or flanges 132, 134, formed on the mounting sleeve 128, the grooves could be formed on mounting sleeve 128 and the guide tracks or flanges 132, 134 formed on the guide block 124.

In the modification illustrated in FIG. 7, a guide block 142, similar to guide block 124 of FIGS. 5 and 6, is adapted to receive a dental tool (not shown) for vibration thereof. The guide block 142 is provided with an elongated slot (not shown) in which a head member 144 having protuberances similar to those on head member 118 of FIGS. 5 and 6 rotates to effect vibration of the head member 144 and thereby vibration of the dental tool associated therewith.

The head member 118 is connected to a mandrel 146 which is rotated by an air turbine 148. The air turbine 148 is provided with an inlet passage 150 which is arranged to be in communication with an air supply conduit that receives its motive fluid, that is air, from a power operated fan similar to the fans 82, 88 illustrated, respectively, in FIGS. 3 and 4.

After reading the foregoing description, it will be apparent that the objects of the invention have been successfully achieved. Accordingly, what is claimed is:

1. A dental appliance comprising a dental handpiece; a mandrel extending from said handpiece and removably secured thereto for rotation thereby; a shaft terminating in a head member located at the outer end of the mandrel, said head member being provided with a group of protuberances circumferentially spaced about the periphery of the head member; a guide block; a scaler extending longitudinally from one end of said guide block; an elongated slot provided in the other end of said guide block into which said head member with its protuberances is received; the length and position of said protuberances being such as to sequentially engage opposed sidewalls of said slot formed in said block and on rotation of said mandrel producing vibration of said guide block and associated scaler; a mounting sleeve mounted on said handpiece; a first pair of diametrically opposed guide tracks secured to said mounting sleeve lying in a first plane; a second pair of diametrically opposed guide tracks secured to said mounting sleeve and lying in a second plane longitudinally spaced from said first plane; and means formed on said guide block and cooperating with said first and second pairs of guide tracks to guide said guide block during vibration of said guide block and scaler.

2. A dental appliance as defined in claim 1 wherein said group of protuberances comprises an odd number of protuberances.

3. A dental appliance as defined in claim 2 wherein the number of protuberances is three.

References Cited
UNITED STATES PATENTS

| | | | |
|---|---|---|---|
| 169,753 | 11/1875 | White | 32—58 |
| 1,125,168 | 1/1915 | Perkins | 32—50 XR |
| 1,335,825 | 4/1920 | Ellerbeck | 32—58 |
| 2,411,234 | 11/1946 | Silver | 32—26 |
| 3,306,375 | 2/1967 | Macks | 32—28 |

ROBERT PESHOCK, Primary Examiner